3,172,910
PERFLUOROALKYL TERMINATED ALKYLENE THIOALKANOIC ACIDS
Neal O. Brace, Wilmington, Del., assignor to E. I. du Pont de Nemours and Company, Wilmington, Del., a corporation of Delaware
No Drawing. Filed Nov. 30, 1961, Ser. No. 156,172
3 Claims. (Cl. 260—539)

This invention is directed to acids of structure $$R_f(CH_2)_mS(CH_2)_nCO_2H$$

and the carboxyl linked derivatives thereof wherein $R_f$ is a perfluoralkyl group, $m$ is from one to 12 and $n$ is from one to 17.

The superior surface active properties of perfluorocarboxylic acids $C_nF_{2+1}CO_2H$ are well known. Recently, acids of structure $C_nF_{2n+1}(CH_2)_mCO_2H$ have been described by Tiers (U.S. 2,965,659 and U.S. 2,951,051) and have exhibited superior surface active properties. Another series of acids of the structure $$C_nF_{2n+1}(CH_2)_mO(CH_2)_nCO_2H$$

have also been found to have superior surface active properties.

Mercaptans of structure $R_fRSH$ where R is an alkylene radical of 3 to 15 carbons and $R_f$ is a perfluoroalkyl group have recently been described (Friedlander, French Patent 1,221,415) while mercaptans of structure $R_fCH_2SH$ have been known for several years (U.S. 2,894,991).

It is therefore an object of this invention to prepare acids of the structure $R_f(CH_2)_mS(CH_2)_nCO_2H$.

It is another object of this invention to provide several methods of synthesis for these acids.

It is still another object to provide carboxyl linked derivatives of these acids.

These and other objects will become apparent in the following description and claims.

More specifically, the present invention is directed to fluorine containing acids of structure $$R_f(CH_2)_mS(CH_2)_nCO_2H$$

wherein $R_f$ is a perfluoroalkyl group of three to about 18 carbons, $m$ is from one to about 12 and $n$ is from one to about 17, and the carboxyl linked derivatives of said fluorine containing acids including salts, metal complexes, acyl halides, anhydrides, amides, amidines, nitriles, hydrazides, esters and thioesters.

Several methods are available for preparing the fluorine containing acids of this invention. For those acids where $n$ is one, the preferred method is reaction of an alkali metal salt of a mercaptan $R_f(CH_2)_mSH$ with a haloacetic acid ester, for instance, ethyl chloroacetate. The resulting esters $R_f(CH_2)_mSCH_2CO_2Et$ are obtained which in turn are hydrolyzed to the free acids $$R_f(CH_2)_mSCH_2CO_2H$$

A somewhat less general method where $n=1$ is to react sodium ethyl mercaptoacetate with the iodides $$R_f(CH_2)_mI (m \geq 3)$$

This method is less general since the iodides $R_fCH_2I$ do not react readily and the iodides $R_fCH_2CH_2I$ tend to eliminate HI to form $R_fCH=CH_2$. Sodium ethyl mercaptoacetate can react with $R_f(CH_2)_mO_3SC_7H_7$ ($C_7H_7$=p-tolyl) to form the desired fluorine containing acids of this invention. This reaction is applicable where $m$ is one or greater but is less preferable because it requires prior preparation of the alcohols $R_f(CH_2)_mOH$ and the tosylate esters thereof.

Several methods are available for preparing fluorine containing acids of this invention wherein $n$ is greater than one. A convenient method involves reacting the mercaptans $R_f(CH_2)_mSH$ with $$CH_2=CH(CH_2)_{n-2}CO_2H$$

or esters thereof, to obtain $R_f(CH_2)_mS(CH_2)_nCO_2H$ or esters thereof. The catalyst required to cause this reaction depends on the value of $n$. When $n$ is two (acrylic acid, preferably as an ester) reaction occurs with the mercaptans in the presence of a base such as pyridine (Gilman, "Organic Chemistry," vol. 1, p. 851). The mercaptans may also be cyanoethylated in the presence of base with acrylonitrile, giving $R_f(CH_2)_mSCH_2CH_2CN$, which is hydrolyzed with mineral acid to the desired product of this invention.

When $n$ is greater than 2, the mercaptans $R_f(CH_2)_mSH$ react with $CH_2=CH(CH_2)_{n-2}CO_2H$ (or esters, salts, amides, nitriles, etc.) in the presence of free radical catalysts to give $R_f(CH_2)_mS(CH_2)_nCO_2H$. Several terminally unsaturated acids are commercially available, for instance, vinyl acetic acid and undecylenic acid, and many others which are known to the art.

An alternate, though more limited, method of preparation for the fluorine containing acids wherein $n$ is greater than 2 is the reaction of salts of terminal mercaptoacids with the iodides $R_f(CH_2)_mI$ ($m>2$) or tosylate esters $R_f(CH_2)_mO_3SC_7H_7$. However, terminal mercaptoacids are not readily available in most cases.

As can be seen from the previous discussion, the preparation of the acids of this invention requires, in the preferred methods, the preparation of the mercaptans $R_f(CH_2)_mSH$. These are readily prepared ($m \geq 3$) by the method of Friedlander, described in French Patent 1,221,415, which involves the reaction of terminal perfluoroalkyl halides $R_f(CH_2)_mX$ (X=Cl, Br or I, $m \geq 3$) with thiourea. This reaction is followed by the hydrolysis of the isothiuronium salt with a strong base. The following equation characterizes the reaction:

$$R_f(CH_2)_mX + CS(NH_2)_2 \longrightarrow$$
$$[R_f(CH_2)_mSC(NH_2)_2]^+X^- \xrightarrow{MOH} R_f(CH_2)_mSH$$

Friedlander's preferred halides were prepared as follows:

$$R_fSO_2Cl + CH_2=CH(CH_2)_{m-2}OH \xrightarrow{\text{free radical}}$$
$$R_fCH_2CHCl(CH_2)_{m-2}OH \xrightarrow[Ni]{H_2HX} R_f(CH_2)_mX$$

We prefer to use the iodides $R_f(CH_2)_mI$, which are available where $m$ is from one to 18. Those where $m$ is even, i.e. 2, 4, 6, 8, 10, 12, etc., are prepared by reaction of perfluoroalkyl iodides with ethylene either thermally, photochemically [Haszeldine, J. Chem. Soc., 2856 (1949)] or in the presence of a free radical generating initiator giving $R_f(CH_2CH_2)_xI$ ($x$=1, 2, 3, 4, 5 etc., $m$=2, 4, 6, 8, 10, etc.). When $m$ is odd and greater than one, i.e. 3, 5, 7, 9, 11, 13, etc., these mercaptans may also be prepared by Friedlander's method from $R_fCH_2(CH_2CH_2)_yI$. This product, $R_fCH_2(CH_2CH_2)_yI$, is in turn obtained from $R_fCH_2I$ and ethylene by the method described in Tiers (U.S. 2,972,638). $R_fCH_2I$ is prepared from $R_fCH_2OH$ as described by Tiers, J. Am. Chem. Soc., 75, 5978 (1953).

Special methods are required for preparing the mercaptans $R_fCH_2SH$ where $m$ is one. Such methods are described by Barr et al., U.S. 2,894,991, Harris, U.S. 2,965,677, Harris and Sheppard, J. Org. Chem., 26, 354 (1961) and Sheppard, U.S. 2,961,470.

The $R_f$ group of the present invention contains from three to about 18 carbons. If $R_f$ contains one or two carbons, although they can be prepared by the methods herein described, the products do not have the desired physical properties. Those with more than 18 carbons are less readily available. $R_f$ may be a straight chain group $[CF_3(CF_2)_{2-17}]$ or branched chained. The former are preferred. The iodides $R_fI$, from which the acids $R_f(CH_2)_mS(CH_2)_nCO_2H$ are ultimately prepared by our preferred methods, are obtained in one of the following ways.

(1) $CF_3I + nCF_2=CF_2 \xrightarrow{heat} CF_3(CF_2CF_2)_nI$ $C_2F_5I + nCF_2=CF_2 \longrightarrow C_2F_5(CF_2CF_2)_nI$ (Haszeldine, J. Chem. Soc., 3761(1953))

n-$C_3F_7I$, $(CF_3)_2CFI$, $C_3F_7CFICF_3$, 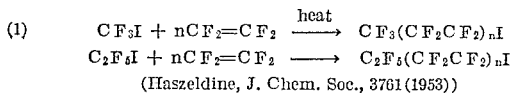 

and the like may also be used, i.e.

$(CF_3)_2CFI + nCF_2=CF_2 \rightarrow (CF_3)_2CF(CF_2CF_2)_nI$ (2) $CF_3I + nCF_2=CFCF_3 \rightarrow CF_3[CF_2CF(CF_3)]_nI$ (Hauptschein et al., French Patent 1,223,259; J. Am. Chem. Soc., 79, 2549 (1957))

(3) $CF_3CF_2CF_2[CF_2CF(CF_3)]_nI + mCF_2=CF_2 \rightarrow$
$CF_3CF_2CF_2-[CF_2CF(CF_3)]_n(CF_2CF_2)_mI$ (Hauptschein et al., J. Am. Chem. Soc., 83, 2501 (1961))

Other methods are available, e.g.

$C_nF_{2n+1}CO_2Ag + I_2 \rightarrow C_nF_{2n+1}I + AgI + CO_2$

The alcohols $R_fCH_2OH$, used to prepare $R_fCH_2I$ are prepared by reduction of the acids $R_fCO_2H$ (Husted et al. U.S. 2,666,797). Since these acids are prepared by electrolytic fluorination of $C_nH_{2n+1}CO_2H$ (Simons et al. 2,567,011), both straight chain and branched chain derivatives are available.

The preferred compounds of the present invention are $R_f(CH_2)_mS(CH_2)_nCO_2H$ wherein $R_f$ is a straight chain perfluoroalkyl group containing from seven to about 12 carbons, wherein $m$ is 2 to 6 and $n$ is from 2 to about 10. The preferred species are $CF_3(CF_2)_a(CH_2)_4S(CH_2)_2CO_2H$ wherein $a$ is 6 or 7.

The following representative examples illustrate the present invention. Parts are by weight unless stated otherwise.

*Example 1*

$CF_3(CF_2)_6(CH_2)_4I$ was prepared by reaction of $CF_3(CF_2)_6I$ with ethylene, B.P. 108°/8 mm.

Thiourea (1.52 parts), $CF_3(CF_2)_6(CH_2)_4I$ (11.1 parts) and ethanol (15 volumes) were heated under reflux for four hours. The isothiuronium salt crystallized at 5° C. and was collected by filtration, M.P. 157–161° C.

*Analysis.*—Calcd. for $C_{12}H_{12}F_{15}N_2SI$: C, 22.9; H, 1.93; S, 5.10. Found: C, 23.0; H, 2.0; S, 5.1.

The salt was hydrolyzed by heating with 8 parts of 10% aqueous sodium hydroxide solution for three hours at 80° C. Acidification with sulfuric acid and extraction with benzene gave $CF_3(CF_2)_6(CH_2)_4SH$, B.P. 85° C./4.2 mm., $n_D^{25}$ 1.3500.

*Analysis.*—Calcd. for $C_{11}H_9F_{15}S$: C, 28.8; H, 2.00; S, 7.00. Found: C, 29.1; H, 2.0; S, 7.3.

Using the same procedure $CF_3(CF_2)_2(CH_2)_4SH$ was prepared, B.P. 62°/21.0 mm., $n_D^{25}$ 1.3650.

*Analysis.*—Calcd. for $C_7H_9F_7S$: C, 32.6; H, 3.5; S, 12.4. Found: C, 32.9; H, 3.6; S, 12.4.

*Example 2*

One part of methyl acrylate was added to a solution of 0.01 part of sodium methoxide in 3 parts of $CF_3(CF_2)_6(CH_2)_4SH$ at 25° C. After standing overnight, the solution was treated with ½ part of potassium hydroxide in five parts 90% ethanol at 80° C. for 7 hours to hydrolyze the ester $CF_3(CF_2)_6(CH_2)_4SCH_2CH_2CO_2CH_3$. Acidification precipitated the acid $CF_3(CF_2)_6(CH_2)_4SCH_2CH_2CO_2H$ (77% yield), M.P. 57–58° C. Recrystallization of the acid product from ethylene chloride raised the melting point to 64.8–65.5° C.

*Analysis.*—Calcd. for $C_{14}F_{15}H_{13}O_2S$: C, 31.7; H, 2.5; S, 6.05. Found: C, 31.8; H, 2.6; S, 6.0.

The following surface tensions of aqueous solutions of the sodium of the acid were observed using a du Nuoy tensiometer.

| Conc., Wt. percent | Corrected surface tension 25° C., dynes/cm. |
|---|---|
| 0.4 | 15.8 |
| 0.2 | 16.7 |
| 0.1 | 17.5 |
| 0.05 | 18.9 |
| 0.025 | 20.7 |
| 0.0125 | 22.2 |
| 0.0067 | 22.4 |
| 0.0033 | 35.4 |
| 0.0017 | 44.6 |
| 0.0008 | 46.4 |
| 0.0004 | 47.3 |
| 0.0000 | 71.0 |

*Example 3*

A mixture of 4.3 parts of ethyl undecylenate $C_3F_7(CH_2)_4S(CH_2)_{10}CO_2C_2H_5$ 5.31 parts of $CF_3(CF_2)_2(CH_2)_4SH$ and 0.7 part of azobisisobutyronitrile was heated under nitrogen at 80–83° C. for five hours. 9.5 parts of $C_3F_7(CH_2)_4S(CH_2)_{10}CO_2C_2H_5$ (100% yield), M.P. 27–29° C., was isolated

*Analysis.*—Calcd. for $C_{20}H_{33}F_7SO_2$: C, 51.1; H, 7.07; F, 28.3; S, 6.8. Found: C, 51.3; H, 7.1; F, 28.4; S, 6.7.

A mixture of 8.5 parts of the above ester, 2.2 parts of potassium hydroxide and 20 parts of 90% ethanol was heated for three hours under reflux. Acidification with concentrated hydrochloric acid precipitated the acid $CF_3(CF_2)_2(CH_2)_4S(CH_2)_{10}CO_2H$ 8.4 parts (100%), M.P. 61–64° C. Recrystallization from methylene chloride raised the melting point to 66–67° C.

*Analysis.*—Calcd. for $C_{18}F_7H_{29}O_2S$: C, 48.9; H, 6.6; S, 7.2. Found: C, 48.9; H, 6.7; S, 7.3.

The sodium salt was prepared as a solution in water. The surface tension of the solution reached a minimum of 18.2 dynes/cm. at a range 0.4–0.1% by weight concentration. The surface tension at 0.0125% was 39.4 dynes/cm. These values compare favorably with $CF_3(CF_2)_2(CH_2)_{10}CO_2Na$ which reaches a minimum of 18.7 dynes/cm.

Derivatives of these acids, other than the esters and salts described above, which may be prepared by known methods include acid chlorides, amides, amidines, nitriles, hydrazides and other esters, e.g.

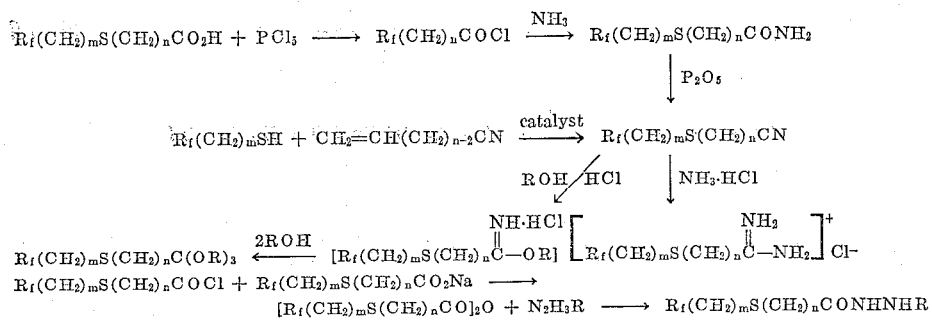

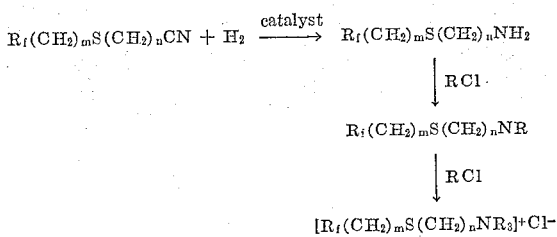

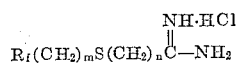

As is shown above, the acids of this invention and the salts thereof are surface active agents in water. The very low surface tensions attainable with these compositions in water have many significant uses. These uses include forming emulsions with low surface tension compositions such as hydrocarbons, halohydrocarbons and the like. One real advantage is that the acids of this invention are somewhat weak and resemble the hydrocarbon carboxylic acids in acidity. The fluorocarbon carboxylic acids which have previously been used for their ability to decrease the surface tension of liquids, are strong acids. Hence, the weak acid compositions of this invention may be substituted for the strong fluorocarbon carboxylic acids in many useful applications. The advantage results that the solutions are less corrosive than those of the fluorocarbon acids while serving the same purpose.

The acid halides are useful intermediates for preparing amides and hydrazides which, as shown above, are prepared by reaction of acid halides with ammonia, amines or hydrazines. The esters of the acids are made by reaction with alcohols or phenols. Substituted aromatic compounds are prepared by reaction of the aromatic compounds with the acid halides using the Friedel-Crafts reaction with the aluminum chloride catalyst. The anhydrides can serve many of the same functions as the acid halides.

The nitriles are not only useful for preparing amidines and substituted amidines as shown heretofore but are also useful as intermediates for preparing amines, e.g.

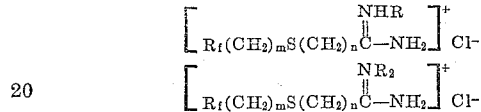

The amidine synthesis shown heretofore involves ammonia to give $$R_f(CH_2)_mS(CH_2)_n\overset{NH \cdot HCl}{\underset{\|}{C}}-NH_2$$

Primary and secondary amines may also be used to give products such as $$\left[R_f(CH_2)_mS(CH_2)_n\overset{NHR}{\underset{\|}{C}}-NH_2\right]^+ Cl^-$$

$$\left[R_f(CH_2)_mS(CH_2)_n\overset{NR_2}{\underset{\|}{C}}-NH_2\right]^+ Cl^-$$

Being salts, these amidines are also useful as surface active agents of the cationic type.

The acids $R_f(CH_2)_mS(CH_2)_nCO_2H$ react with heavy metal halides such as chromium chloride in the well known manner to form complexes which are useful as leather treating agents and in like applications.

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is understood that this invention is not limited to the specific embodiments thereof except as defined in the appended claims.

The embodiments of this invention in which an exclusive property or privilege is claimed are defined as follows:

1. Fluorine containing acids exhibiting surface active properties having the structure $R_f(CH_2)_mS(CH_2)_nCO_2H$ wherein $R_f$ is a perfluoroalkyl group of three to about 18 carbon atoms, $m$ is from one to about 12 and $n$ is from one to about 17.

2. A compound exhibiting surface active properties selected from the group consisting of fluorine-containing acids and their alkali metal salts, said fluorine-containing acids having the structure $R_f(CH_2)_mS(CH_2)_nCO_2H$ wherein $R_f$ is a perfluoroalkyl group of 3 to about 18 carbon atoms, $m$ is from 1 to about 12 and $n$ is from 1 to about 17.

3. A fluorine containing acid exhibiting surface active properties having the structure $$CF_3(CF_2)_6(CH_2)_4S(CH_2)_2CO_2H$$

References Cited in the file of this patent
UNITED STATES PATENTS 2,449,992    Gresham et al  _____ Sept. 28, 1948

UNITED STATES PATENT OFFICE
CERTIFICATE OF CORRECTION

Patent No. 3,172,910

March 9, 1965

Neal O. Brace

It is hereby certified that error appears in the above numbered patent requiring correction and that the said Letters Patent should read as corrected below.

Column 4, line 43, for "$C_3F_7(CH_2)_4S(CH_2)_{10}CO_2C_2H_5$" read -- ($CH_2=CH(CH_2)_8CO_2C_2H_5$) --; line 48, for "$C_2F_7(CH_2)_4S(CH_2)_{10}CO_2C_2H_5$" read -- $C_3F_7(CH_2)_4S(CH_2)_{10}CO_2C_2H_5$ --; same column 4, line 75, for "other" read -- ortho --; column 5, line 1, for the formula reading "$R_f(CH_2)_nCOCl$" read -- $R_f(CH_2)_mS(CH_2)_nCOCl$ --.

Signed and sealed this 14th day of September 1965.

(SEAL)
Attest:

ERNEST W. SWIDER
Attesting Officer

EDWARD J. BRENNER
Commissioner of Patents